United States Patent [19]
Vogel et al.

[11] Patent Number: 5,220,775
[45] Date of Patent: Jun. 22, 1993

[54] APPARATUS FOR REMOVING FRUIT

[76] Inventors: John V. Vogel; John V. Vogel, Jr., both of 12014 North St., Gibsonton, Fla. 33534

[21] Appl. No.: 822,855

[22] Filed: Jan. 21, 1992

[51] Int. Cl.⁵ .................... A01D 46/00; A01D 46/24
[52] U.S. Cl. ........................ 56/328.1; 56/340
[58] Field of Search ............ 56/328.1, 329, 333, 56/340

[56] References Cited

U.S. PATENT DOCUMENTS

| | | |
|---|---|---|
| 3,404,521 | 10/1968 | Thorn et al. ............ 56/328.1 |
| 3,427,796 | 2/1969 | McCray et al. |
| 3,541,772 | 11/1970 | Miller . |
| 3,543,492 | 12/1970 | Nixon ..................... 56/328.1 |
| 3,552,107 | 1/1971 | Swift ...................... 56/328.1 |
| 3,566,594 | 3/1971 | Ellis ....................... 56/328.1 |
| 3,925,973 | 12/1975 | Glover .................... 56/328.1 |
| 3,968,631 | 7/1976 | Haines .................... 56/328.1 |
| 3,987,608 | 10/1976 | Wilcox, Jr. ............. 56/328.1 |
| 4,141,204 | 2/1979 | Kuryluk ................... 56/330 |
| 4,357,790 | 11/1982 | Tyros ...................... 56/328.1 |

Primary Examiner—George A. Suchfield
Attorney, Agent, or Firm—Frijouf, Rust & Pyle

[57] ABSTRACT

An apparatus and method is disclosed for an improved apparatus for removing fruit from a tree comprising a rotatable member rotatably mounted to a frame having a first and a second array of picking arms with each array having a plurality of parallel spaced picking arms. The picking arms extend radially outwardly from the rotatable member with each of the picking arms having a transfer portion, an extracting portion and a retaining portion. The extracting portions define a curvature in a general shape of a hook with the retaining portions defining a barb. Rotating of the rotatable member entraps the fruit between adjacent picking arms with the extracting portions removing the fruit from the tree and with the retaining portions enabling the migration of the fruit along the transfer portion to a collector.

14 Claims, 5 Drawing Sheets

APPARATUS FOR REMOVING FRUIT

BACKGROUND OF THE INVENTION

1. Field Of The Invention

This invention relates to automated picking devices for picking fruit and more particularly, to an automated picking device for picking large fruit with stems such as oranges, apples and the like.

2. Background Of The Invention

The use of automated machinery in farming has resulted in high crop yields and minimum labor costs and has resulted in low cost fruit and vegetables products to be available throughout the world. The prior art has successfully automated the planting, irrigation, fertilization and the application of insecticides to various types of crops. Although the aforementioned procedures have been highly automated in the farming industry, the task of picking or removing fruit from the tree has heretofore not been successfully automated for many types of fruit and vegetables crops. Once the crop is manually picked, the farming industry has automated the processing of fruits and vegetables for transportation or for packaging for retail sales.

The task of removing fruit or vegetables from a tree or plant has heretofore not been totally resolved by the prior art due a number of problems existing in the removal process. First, the fruit must be removed in an automated fashion without damage to the fruit or vegetable. Secondly, the fruit must be removed without damage to the tree or plant producing the fruit or vegetable. Third, the automated picking apparatus must be of such a character as to be extremely mobile enabling the automated machinery or apparatus to remove fruit or vegetables located or distributed about the various positions of the tree or plant. Although the automated picking devices of the prior art have been able to successfully remove fruit or vegetables from a plant or tree without damage to the fruit or vegetable or without damage to the plant or tree, the apparatuses have been overly complex and bulky. Accordingly, these automated devices have not obtained the mobility required for the rapid removable of fruit or vegetables from a tree or plant in an automated process. Furthermore, many of these devices have not been successful in picking or removing substantially all of the fruit or vegetables from the tree or plant due to the lack of mobility of the apparatus. Accordingly, the fruit or vegetables remaining on the plant or tree must be picked or removed in a manual fashion, thus adding to the labor costs of producing the fruit or vegetable to market.

U.S. Pat. No. 3,427,796 to McCray et al. discloses a fruit picker having an adjustably mounted picker head adapted to rotate in a first direction while individual gripping rollers carried by the head rotate in an opposite direction to grip and twist fruit free as the head is advanced into the foliage of the tree. The apparatus incorporates comb-like members to initially received and direct the fruit.

U.S. Pat. No. 3,541,772 to Miller discloses a fruit harvester carried by a tractor to pick a fruit from a tree comprising a reel having transversely extending bars that engage the fruit. The bars cooperate with a stationery shearing bar to sever the stems of the fruit after the fruit has been gathered by the fingers.

U.S. Pat. No. 3,925,973 to Glover discloses a fruit picking apparatus comprising a hollow, cylindrical housing enclosing a spiral auger with a fruit infeed opening provided at one end of the housing adjacent the spiral auger. A first discharge outlet is provided at the opposite end of the housing adjacent the spiral auger. A stripper flange is defined in the outer edge of the spiral auger adjacent the fruit infeed opening for engaging the fruit and removing the fruit so that continuous rotation of the spiral auger the fruit and stem is removed and subsequently discharged through the discharge output.

U.S. Pat. No. 3,968,631 to Haines discloses a fruit picking device having a rotatable assembly having a plurality of outstanding fingers spaced along an elongated drum. The elongated drum is rotated such that the fingers will contact fruit to be picked from a tree or the like.

U.S. Pat. No. 3,987,608 to Wilcox discloses a fruit picking apparatus comprising an adjustable boom assembly having a picker head having a rotor with a plurality of picking fingers extending therefrom. The picking fingers pick the fruit upon rotation of the rotor for discharge through a conveyor system collector receptacle.

U.S. Pat. No. 4,357,790 to Tyros shows a power actuated picking head mounted on an elongated handle for picking olives or similar fruit. The picking head comprises a power rotated rake-like member for raking the fruit into a hopper for discharge through a shoot into a collector.

Although the aforementioned prior art has attempted to automate the fruit picking process, none of the prior art devices has automated the process of picking fruit in a simple, reliable and efficient manner.

Therefore, it is an object of the present invention to provide a fruit picking device which overcomes the problems of the prior art and provides a substantially improvement to the fruit picking art.

Another object of this invention is to provide an apparatus for removing fruit from a tree comprising a rotatable member having a plurality of picking arms which is light-weight and may be mounted on a coupling boom of conventional design for use with a mobile vehicle.

Another object of this invention is to provide an apparatus for picking fruit from a tree. The apparatus may be controlled and manipulated by an operator within a mobile vehicle.

Another object of this invention is to provide an apparatus for removing fruit from a tree wherein the apparatus does not damage the fruit or the tree during the removal process.

Another object of this invention is to provide an apparatus for removing fruit from a tree incorporating a plurality of uniquely contoured picking arms for removing and retaining the picked fruit and for enabling the migration of fruit from the picking arms into a collector.

Another object of this invention is to provide an apparatus for removing fruit from a tree which may be manufactured at a modest cost.

Another object of this invention is to provide an apparatus for removing fruit from a tree which is simple, reliable and efficient and may be readily repaired without specialized equipment.

Another object of this invention is to provide an apparatus for removing fruit from a tree wherein the apparatus is light-weight and may be rapidly manipulated on a coupling boom for picking the fruit dispersed about a tree.

Another object of this invention is to provide an apparatus for removing fruit from a tree wherein the apparatus will not be jammed in the unlikely event that a branch of the tree is severed during the picking process.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved apparatus for removing fruit having a stem from a tree comprising a rotatable member rotatably mounted to a frame with a first and a second array of picking arms with each array having a plurality of picking arms. Each of the plurality of picking arms has a transfer portion, an extracting portion and a retaining portion. The transfer portion of each of the picking arms is secured to the rotatable member with the plurality of picking arms extending radially outwardly from the rotatable member in a parallel relationship defining a space therebetween. The space between the picking arms is less than the diameter of the fruit. The extracting portions define a curvature in a general shape of a hook and with the retaining portions defining a barb extending from the extracting portion in a direction toward the transfer portion. The rotatable member rotates relative to the mobile frame enabling the picking arms to entrap the fruit with the stem thereof located in the space between adjacent picking arms. The extracting portions of the picking arms remove the fruit from the tree and the retaining portions enable the fruit to be retained in the extracting portions and to migrate along the transfer portions. A collector is disposed proximate the transfer portions of the picking arms for collecting the fruit.

In a more specific embodiment of the invention, the apparatus includes a mobile vehicle and a coupling boom for supporting the frame relative to the mobile vehicle with the coupling boom movably supporting the frame relative to the mobile vehicle to position the plurality of picking arms proximate the fruit on the tree.

In one embodiment of the invention, the rotatable member is a substantially cylindrical rotatable member having a cylindrical axis with the cylindrical rotatable member being rotatable about the cylindrical axis and the transfer portions of the picking arms being secured proximate an outer cylindrical surface of the cylindrical rotatable member.

Preferably, the collector is cylindrical having an open top and is at least partially disposed within the hollow internal volume of the cylindrical rotatable member. The outer cylindrical surface of the cylindrical rotatable member has a rotatable member aperture disposed adjacent the transfer portions of the picking arms for enabling the fruit to migrate through the rotatable member aperture into the collector. The cylindrical collector has a discharge opening disposed in a cylindrical end thereof with discharge means facilitating the discharge of the fruit from the collector through the discharge aperture.

In one embodiment of the invention, the discharge means includes the generally cylindrical collector being tapered along an axial length of the collector for facilitating the discharge of the fruit from the collector through the discharge aperture. In another embodiment of the invention, the discharge means includes an auger for facilitating the discharge of the fruit from the collector through the discharge aperture.

A first and a second retaining plate may be secured relative to the first and second array of picking arms and adjacent a first and a second cylindrical end of the cylindrical rotatable member for facilitating the migration of the fruit through the rotatable member aperture into the collector.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
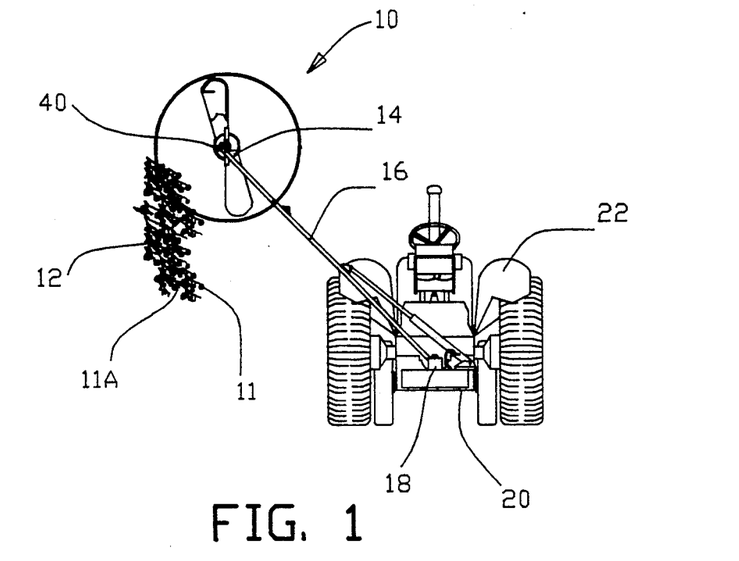
FIG. 1 is a side view of an apparatus for removing fruit of the present invention mounted on a mobile vehicle.
Figure 2:
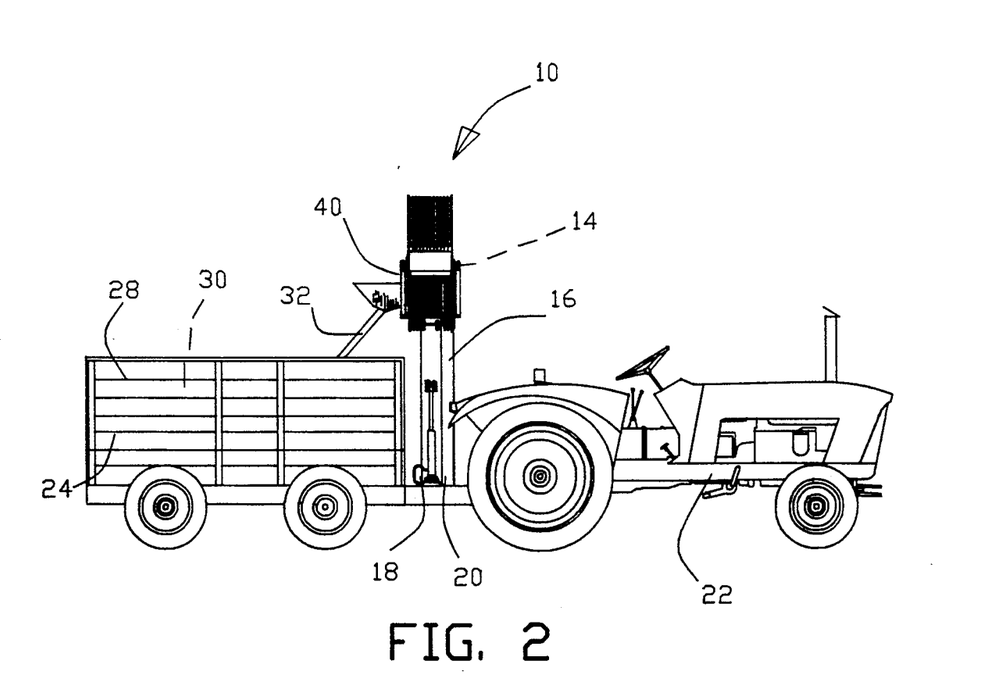
FIG. 2 is a right side view of FIG. 1.

FIGS. 1 and 2 illustrate an apparatus 10 for removing fruit 11 having stems 11A from a tree 12 incorporating the present invention. The apparatus 10 is shown disposed on a distal end 14 of a coupling boom 16. A proximal end 18 of the coupling boom 16 is mounted on a support 20 secured to a mobile platform shown as a tractor 22. The support 20 may be secured to virtually any make or model tractor or in the alternative, may be mounted to a truck such as a pickup truck or a flatbed truck or the like. The tractor 22 is shown pulling a trailer 24 through a hitch 26. The trailer 24 includes upright walls 28 for defining a volume 30 for receiving the fruit 11 picked by the apparatus 10. A chute 32 interconnects the apparatus 10 with the volume 30 of the trailer 24 for automatically transferring the fruit 11 picked by the apparatus 10 to the trailer.

Preferably, the operation of the apparatus 10 as well as the position of the coupling boom 16 is controlled by an operator (not shown). The operator positions the apparatus 10 proximate a first portion of the tree 12 to enable the apparatus to pick the fruit 11 as will be described in greater detail hereinafter. Subsequently, the operator moves the coupling boom 16 to position the apparatus 10 to a different portion of the tree 12 to continue picking the fruit 11 with the apparatus 10.

Figure 3:
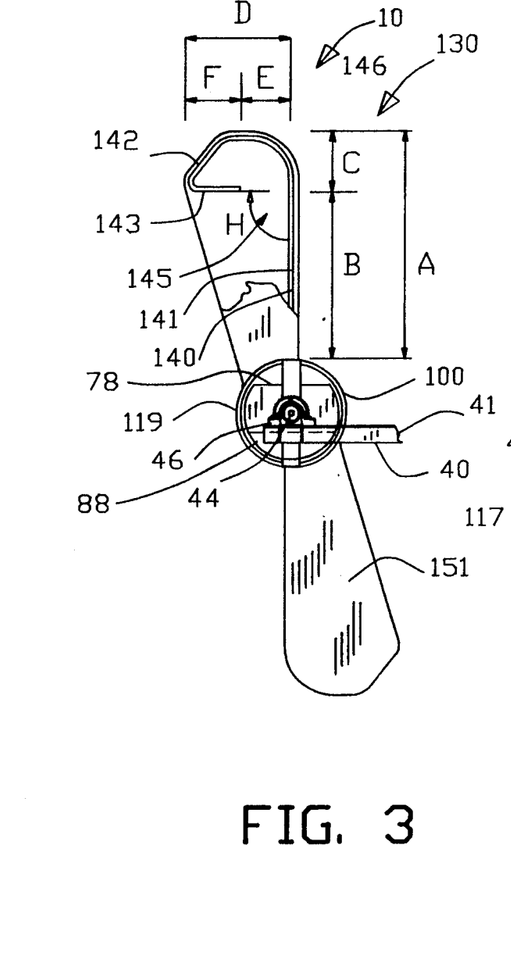
FIG. 3 is an enlarged side view of a portion of the apparatus for removing fruit shown in FIG. 1.
Figure 4:
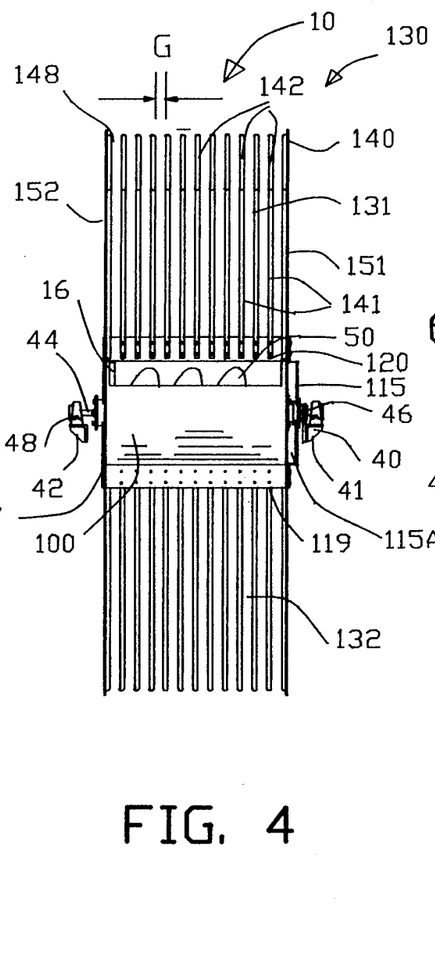
FIG. 4 is a front view of FIG. 3.
Figure 5:
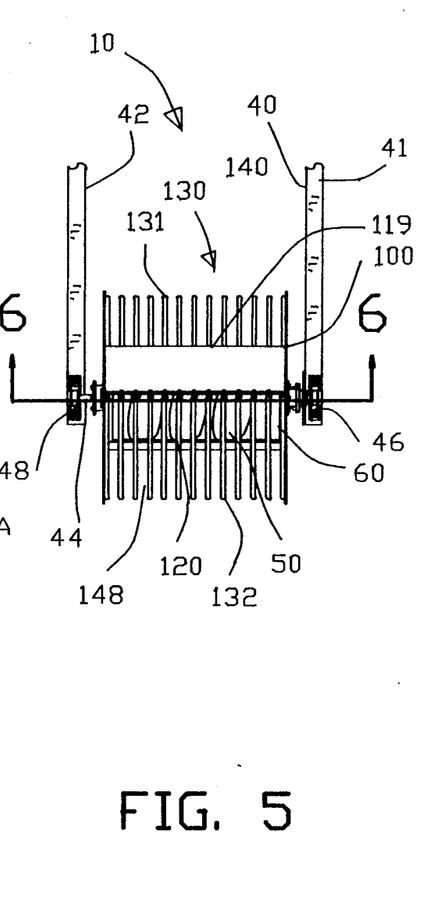
FIG. 5 is a top view of FIG. 4.
Figures 6, 7, 8, 9:
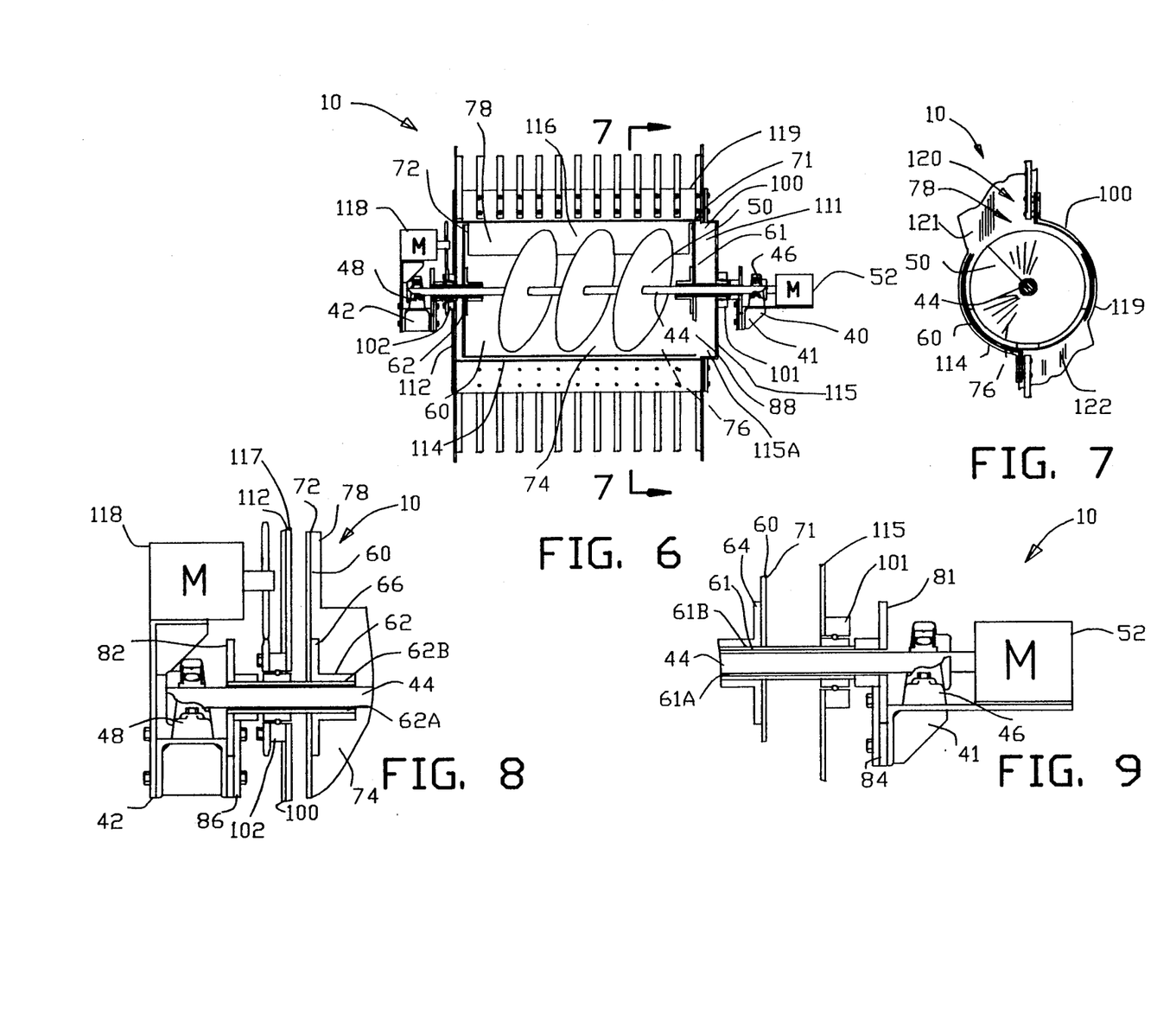
FIG. 6 is an enlarged sectional view along line 6—6 in FIG. 5.
FIG. 7 is a sectional view along line 7—7 in FIG. 6.
FIG. 8 is an enlarged view of a left portion of FIG. 6.
FIG. 9 is an enlarged view of a right portion of FIG. 6.
Figures 10, 11:
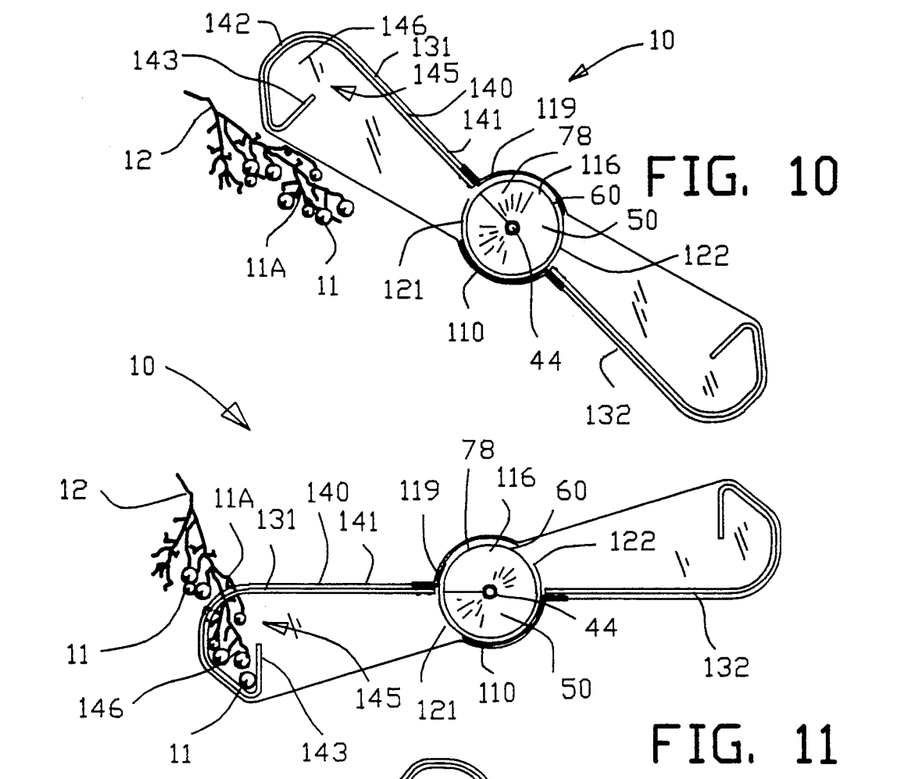
FIG. 10 shows a first position of rotation of the apparatus of the present invention illustrating the apparatus adjacent fruit on a tree.
FIG. 11 shows a second position of rotation of the apparatus of the present invention illustrating the apparatus entrapping the fruit on the tree and severing the fruit from the tree.

FIGS. 3-5 illustrate the apparatus 10 with a greater detail being shown in FIGS. 6-9. The apparatus 10 comprising a frame 40 having a first and a second frame arm 41 and 42 for supporting a rotatable shaft 44 through a first and a second bearing 46 and 48. An auger 50 is secured to the rotatable shaft 44 intermediate the first and second frame arms 41 and 42. As best shown in FIGS. 6 and 10, an auger motor 52 is secured between the first frame arm 41 and the rotatable shaft 44 for rotating the rotatable shaft 44 and the auger 50 relative to the frame 40.

A collector 60 is rotatable mounted relative to the rotatable shaft 44 through a first and a second journal 61 and 62. As best shown in FIGS. 9 and 10, the first and a second journal 61 and 62 comprise sleeves having inner surfaces 61A and 62A journals rotatably engaging the shaft 44. Outer surfaces 61B and 62B of the first and second journals 61 and 62 are secured to first and second circular brackets 64 and 66 for support generally circular first and second collector end walls 71 and 72 and a generally cylindrical collector wall 74 for defining a generally cylindrical collector volume 76 therein. The collector 60 includes an open top defined by an input opening 78 in the generally cylindrical collector wall 74 for enabling the fruit 11 to enter the generally cylindrical collector volume 76 as will be described in greater detail hereinafter.

Circular brackets 81 and 82 are secured to the outer surfaces 61B and 62B of the first and second journals 61 and 62 and are rigidly secured to the first and second frame arms 41 and 42 by a first and a second stabilizer arm 84 and 86. The stabilizer arms 84 and 86 in cooperation with the circular brackets 64 and 66, the circular brackets 81 and 82 and the first and second journals 61 and 62 inhibit rotation of the collector 60 relative to the frame 40 while allowing the rotation of the auger 50 within the collector volume 74 upon rotation of the auger motor 52 and the rotatable shaft 44.

As best shown in FIG. 6, a discharge aperture 88 is defined in the first collector end wall 71 of the collector 60 for enabling the fruit 11 to be discharged from the generally cylindrical collector volume 76. As will be described in greater detail hereinafter, the fruit 11 discharged from the discharge aperture 88 enters the chute 32 for transfer to the volume 30 of the trailer 24 for automatically transferring the fruit 11 picked by the apparatus 10.

A rotatable member 100 is rotatably mounted relative to shaft 44 through a first and second rotatable mounting 101 and 102 shown as bearing. The first and second rotatable mountings 101 and 102 rotatably engaging with the outer surface 61B and 62B of the first and second journals 61 and 62.

The first and second rotatable mountings support generally circular first and second rotatable member ends 111 and 112. The rotatable member 100 defines a generally cylindrical rotatable member wall 114 for defining a generally cylindrical internal volume 116 of the rotatable member 100. The first rotatable member end 111 is connected through a bracket 115 to the first rotatable mounting 101. The bracket 115 defines a void 115A for enabling the fruit 11 to be discharged from the generally cylindrical internal volume 116. The generally circular second rotatable member end 112 is connected through an end wall 117 to the second rotatable mounting 102.

A rotatable member motor 118 is secured between the second frame arm 42 and the rotatable member 100 for rotating the rotatable member 100 relative to the frame 40. The generally cylindrical rotatable member wall 114 defines a generally cylindrical outer surface 119 of the rotatable member 100.

The internal volume 116 of the rotatable member 100 receives the collector 60 therein. The arrangement of the first and second rotatable mountings 101 and 102 and the first and second journals 61 and 62 enable the collector 60 to remain in a fixed relative to the frame 40 while enabling the auger 50 and the rotatable member 100 to independent rotate upon rotation of the auger motor 52 and the rotatable member motor 118.

The rotatable member 100 includes an aperture 120 defined in the generally cylindrical rotatable member wall 114. In this embodiment as shown in FIG. 7, the rotatable member 100 includes a first and a second aperture 121 and 122 defined in the generally cylindrical rotatable member wall 114. The first and second apertures 121 and 122 enable the fruit 11 to enter one of the first and second apertures 121 and 122 and pass through the input opening 78 in the generally cylindrical collector wall 74 to be received into the generally cylindrical collector volume 76 as will be described in greater detail hereinafter.

As best shown with reference to FIGS. 3-5, the apparatus includes a plurality of picking arms 130 arranged as a first and a second array of picking arms 131 and 132. Each of the plurality of picking arms, for example picking arm 140 in FIG. 3, has a transfer portion 141, an extracting portion 142 and a retaining portion 143.

The transfer portion 141 is substantially linear and is secured to the outer cylindrical surface 119 of the rotatable member 100. The transfer portion 141 of the picking arm 140 is disposed adjacent to the rotatable member aperture 120. The extracting portion 142 of the picking arm 140 extends in a semi-circular shape through an angle of approximately one hundred and eighty (180) degrees. The retaining portion 143 of the picking arm 140 partially extends from the extracting portion 142 toward the transfer portion 141 and is generally perpendicular to the transfer portion 141. The retaining portion 143 and the transfer portion 141 define a pathway 145 therebetween for enabling the fruit 11 to enter through the pathway 145 and be retained in a retaining region 146 defined between the extracting portion 142 and the retaining portion 143.

The extracting portion 142 of the picking arm defines a curvature in a general shape of a hook whereas the retaining portion 143 of the picking arm 140 defines a barb extending from the extracting portion 142 in a direction toward the transfer portion 141.

An example of an apparatus 10 constructed for picking oranges, the picking arm 140 in FIGS. 3 and 4 was constructed of 0.5 inch tubular spring steel having the following dimensions:

| Component | Dimension |
|---|---|
| A | 24.0 (inches) |
| B | 16.5 (inches) |
| C | 6.0 (inches) |
| D | 16.0 (inches) |
| E | 9.5 (inches) |
| F | 8.5 (inches) |
| G | 2.0 (inches) |
| H | 90 (degrees) |

It should be appreciated by those skilled in the art that the above dimensions are by was of example and that numerous variations in materials and dimensions may be resorted to without departing from the scope of the invention. Furthermore, it should be appreciated by those skilled in the art that the above dimensions should be modified based on the desired fruit 11 to be picked by the apparatus 10.

As shown in FIG. 4 the first and second array of picking arms 131 and 132 extend radially outwardly from the rotatable member 100 with the plurality of picking arms 130 being in a parallel relationship defining a space 148 between each of the plurality of picking arms 130. Preferably, the space 148 between each of the plurality of picking arms 130 is less than the diameter of the fruit 11.

A first and a second retaining plate 151 and 152 are secured to the picking arms 130 adjacent the first and second end walls 111 and 112 of the rotatable member 100 for retaining the fruit 11 therebetween. Preferably, the first and second retaining plates 151 and 152 are constructed of a durable, transparent polymeric material. The transparency the first and second retaining plates 151 and 152 will not obstruct the vision of an operator.

FIGS. 10-15 illustrate the rotation of the first and second array of picking arms 131 and 132 about the shaft 44. FIG. 10 illustrates the apparatus 10 moved by the coupling boom 16 in proximity to the tree 12 with the first array of picking arms 131 located adjacent to the fruit 11 on the tree 12.

FIG. 11 illustrates a partial counterclockwise rotation of the rotating member 100 relative to FIG. 10 whereby the fruit 11 enters the pathway 145 to enter the retaining region 146 to entrap the fruit 11 within the retaining region 146. The stem 11A of the fruit 11 extend within the spaces 148 between adjacent one of the plurality of picking arms 130 within the extracting portion 142. The retaining portion 143 retains the picked fruit 11 within the retaining region 146 defined by the extracting portion 142 and the retaining portion 143.

Figure 12:
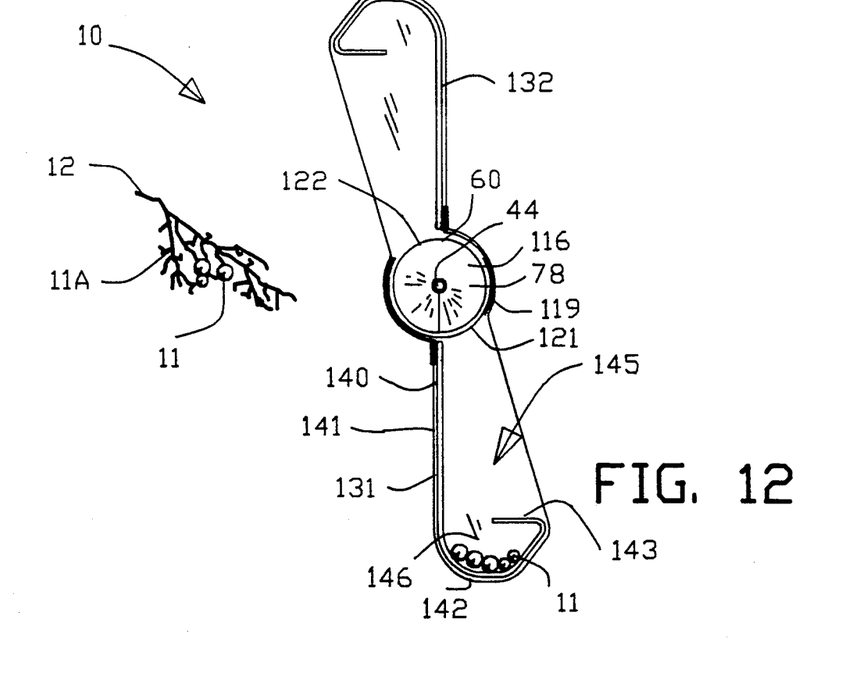
FIG. 12 shows a third position of rotation of the apparatus of the present invention illustrating the apparatus retaining the severed fruit.

FIG. 12 illustrates a partial counterclockwise rotation of the rotating member 100 relative to FIG. 11 wherein the extracting portion 142 of the plurality of picking arms 130 removing the fruit 11 from the tree 12 by the force of rotation of the rotating member 100. The rotation of the rotating member 100 results in the extracting portion 142 severing and removing the fruit 11 from the tree 12. The removed fruit 11 is retained within the retaining region 146 now defined solely by the extracting portion 142 by action of gravity.

Figures 13, 14, 15:
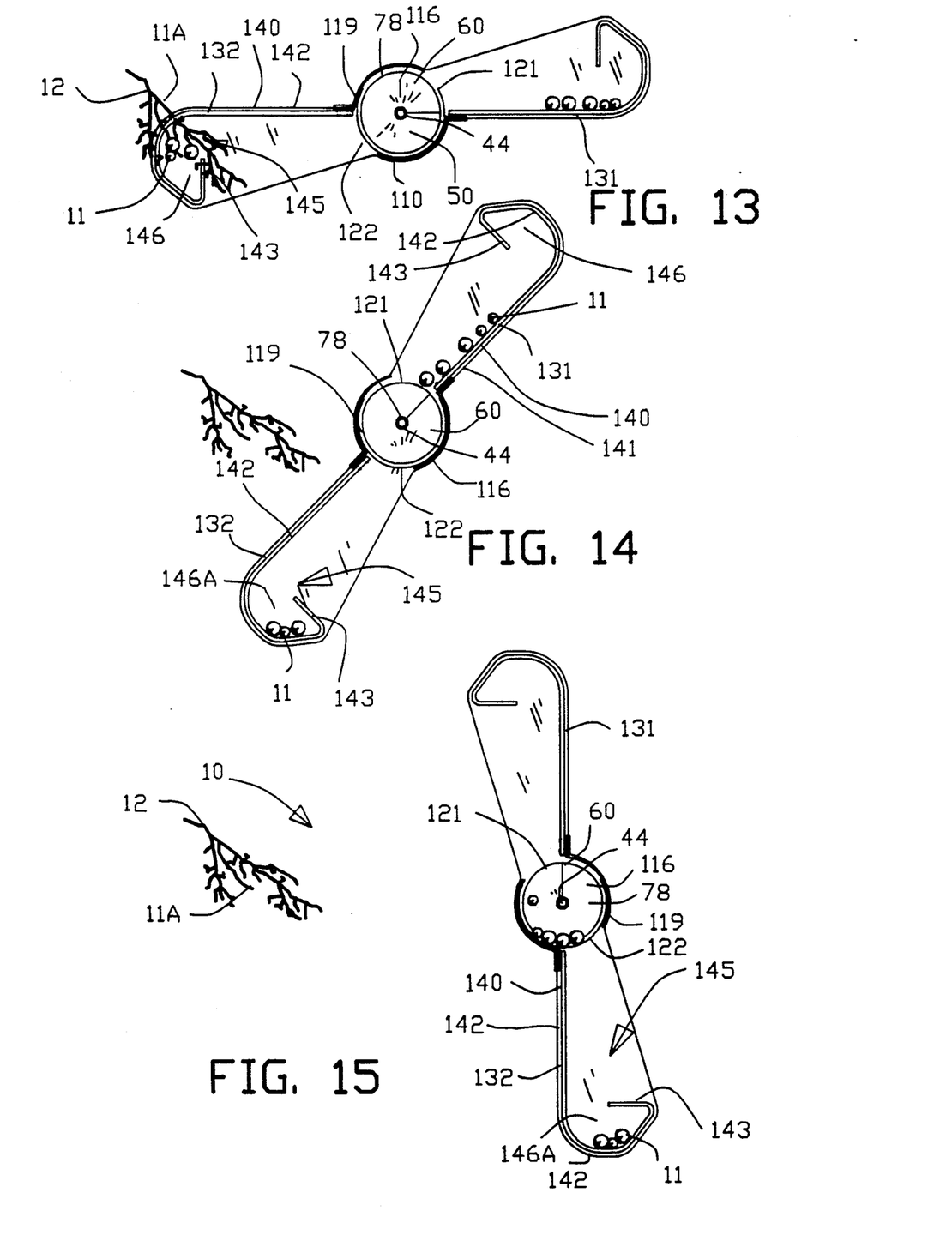
FIG. 13 shows a fourth position of rotation of the apparatus of the present invention illustrating the migration of the severed fruit within the apparatus.
FIG. 14 shows a fifth position of rotation of the apparatus of the present invention illustrating the continued migration of the severed fruit within the apparatus.
FIG. 15 shows a seventh sixth of rotation of the apparatus of the present invention illustrating the collection of the severed fruit within the apparatus.

FIG. 13 illustrates a partial counterclockwise rotation of the rotating member 100 relative to FIG. 13 wherein the rotational position of the rotatable member 100 results in the action of gravity initially moving the picked fruit 11 from the retaining region 146 along the transfer portion 141. Concomitantly therewith, the second array of picking arms 132 are entrapping fruit 11 within the retaining region 146A in an identical manner as explained with reference to FIG. 11.

FIG. 14 illustrates a partial counterclockwise rotation of the rotating member 100 relative to FIG. 13 wherein the rotational position of the rotatable member 100 results in the action of gravity moving the picked fruit 11 from the retaining region 146 along the transfer portion 141. Concomitantly therewith, the second array of picking arms 132 extract and remove the fruit 11 from the tree 12 by the force of rotation of the rotating member 100 in an identical manner as explained with reference to FIG. 11.

FIG. 15 illustrates a partial counterclockwise rotation of the rotating member 100 relative to FIG. 15 wherein the rotational position of the rotatable member 100 results in the action of gravity migrating the picked fruit 11 along the transfer portion 141. The picked fruit 11 migrates through the aperture 121 in the rotating member 100 and through the input opening 78 of the collector 60 to enter the collector volume 76. It should be appreciated that continued rotation of the rotatable member 100 results in the fruit 11 picked by the second array of picking arms 132 moving through the aperture 122 in the rotating member 100 and through the input opening 78 of the collector 60 for entering the collector volume 76.

After the fruit 11 enters the collector volume 76, the rotation of the auger 50 moves the fruit 11 to the discharge aperture 88. The fruit 11 is discharged from the collector 60 through the discharge aperture 88 and the void 115 defined by the bracket 115 into the chute 32 for transfer to the volume 30 of the trailer 24.

The present invention provide an apparatus which is light-weight and may be mounted on a coupling boom of conventional design for use with a mobile vehicle. The apparatus may be controlled and manipulated by an operator within a mobile vehicle and automatically transfers picked fruit to the mobile vehicle. The apparatus provides a simple, low cost reliable and efficient solution for the fruit picking art.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for removing fruit having a stem from a tree, comprising:
   a frame;
   a rotatable member rotatably mounted to said frame;
   a first and a second arrays of picking arms;
   each of said first and second arrays of picking arms having a plurality of picking arms;
   each of said plurality of picking arms having a transfer portion, an extracting portion and a retaining portion;
   said transfer portion of each of said plurality of picking arms being secured to said rotatable member;
   said plurality of picking arms extending radially outwardly from said rotatable member and being in a parallel relationship defining a space between each of said plurality of picking arms;
   said space between each of said plurality of picking arms being less than the diameter of the fruit;
   said extracting portion of each of said plurality of picking arms defining a curvature in a general shape of a hook;
   said retaining portion of each of said plurality of picking arms defining a barb extending from said extracting portion in a direction toward said transfer portion;
   rotating means for rotating said rotatable member relative to said mobile frame enabling said plurality of picking arms to entrap the fruit with the stem thereof located in said space between adjacent picking arms;
   said extracting portion of said plurality of picking arms removing the fruit from the tree upon rotation of said rotating means;
   said retaining portion of said plurality of picking arms enabling the fruit to be retained in said extracting portion and to migrate along said transfer portion upon continued rotation of said rotating means; and
   a collector disposed proximate said transfer portion of said plurality of picking arms for collecting the fruit.

2. An apparatus for removing fruit as set forth in claim 1, including a mobile vehicle;
   a coupling boom for supporting said frame relative to said mobile vehicle; and
   said coupling boom movably supporting said frame relative to said mobile vehicle to position said plurality of picking arms proximate the fruit on the tree.

3. An apparatus for removing fruit as set forth in claim 1, wherein said rotatable member is a substantially cylindrical rotatable member having a cylindrical axis;
   said cylindrical rotatable member being rotatable about said cylindrical axis; and
   said transfer portion of each of said plurality of picking arms being secured proximate an outer cylindrical surface of said cylindrical rotatable member.

4. An apparatus for removing fruit as set forth in claim 1, wherein said rotatable member is a substantially cylindrical rotatable member having a cylindrical axis and defining a hollow internal cylindrical volume;
   said cylindrical rotatable member being rotatable about said cylindrical axis;
   said transfer portion of each of said plurality of picking arms being secured proximate an outer cylindrical surface of said cylindrical rotatable member; and
   said collector being at least partially disposed within said hollow internal volume of said cylindrical rotatable member.

5. An apparatus for removing fruit as set forth in claim 1, wherein said rotatable member is a substantially cylindrical rotatable member having a cylindrical axis and defining a hollow internal cylindrical volume;
   said cylindrical rotatable member being rotatable about said cylindrical axis;
   said transfer portion of each of said plurality of picking arms being secured proximate an outer cylindrical surface of said cylindrical rotatable member;
   said collector being at least partially disposed within said hollow internal volume of said cylindrical rotatable member; and
   said outer cylindrical surface of said cylindrical rotatable member having a rotatable member aperture disposed adjacent said transfer portion of each of said plurality of picking arms for enabling the fruit to migrate through said rotatable member aperture into said collector.

6. An apparatus for removing fruit as set forth in claim 1, wherein said rotatable member is a substantially cylindrical rotatable member having a cylindrical axis and defining a hollow internal cylindrical volume;
   said cylindrical rotatable member being rotatable about said cylindrical axis:
   said transfer portion of each of said plurality of picking arms being secured proximate an outer cylindrical surface of said cylindrical rotatable member;
   said collector being substantially cylindrical having a cylindrical axis;
   said cylindrical collector having an open top and being disposed within said hollow internal volume of said cylindrical rotatable member; and
   said outer cylindrical surface of said cylindrical rotatable member having a rotatable member aperture disposed adjacent said transfer portion of each of said plurality of picking arms for enabling the fruit to migrate through said rotatable member aperture into said collector.

7. An apparatus for removing fruit as set forth in claim 1, wherein said rotatable member is a substantially cylindrical rotatable member having a cylindrical axis and defining a hollow internal cylindrical volume;
   said cylindrical rotatable member being rotatable about said cylindrical axis;
   said transfer portion of each of said plurality of picking arms being secured proximate an outer cylindrical surface of said cylindrical rotatable member;
   said collector being generally cylindrical having a cylindrical axis;
   said generally cylindrical collector having an open top and being disposed within said hollow internal volume of said cylindrical rotatable member;
   said outer cylindrical surface of said cylindrical rotatable member having a rotatable member aperture disposed adjacent said transfer portion of each of said plurality of picking arms for enabling the fruit to migrate through said rotatable member aperture into said collector;
   said cylindrical collector having a discharge aperture disposed in a cylindrical end thereof; and discharge means for facilitating the discharge of the fruit from said collector through said discharge aperture.

8. An apparatus for removing fruit as set forth in claim 7, wherein said discharge means includes an auger for facilitating the discharge of the fruit from said collector through said discharge aperture.

9. An apparatus for removing fruit as set forth in claim 1, wherein each of said plurality of picking arms is a unitary member.

10. An apparatus for removing fruit as set forth in claim 1, wherein said rotatable member is a substantially cylindrical rotatable member having a cylindrical axis and defining a first and second cylindrical end;

said cylindrical rotatable member being rotatable about said cylindrical axis;

said transfer portion of each of said plurality of picking arms being secured proximate an outer cylindrical surface of said cylindrical rotatable member;

said outer cylindrical surface of said cylindrical rotatable member having a rotatable member aperture disposed adjacent said transfer portion of each of said plurality of picking arms; and a first and a second retaining plate secured relative to each of said first and second arrays of picking arms and adjacent said first and second cylindrical ends of said cylindrical rotatable member for facilitating the migration of the fruit through said rotatable member aperture into said collector.

11. An apparatus for removing fruit as set forth in claim 1, wherein said rotatable member is a substantially cylindrical rotatable member having a cylindrical axis and defining a hollow internal cylindrical volume;

said cylindrical rotatable member being rotatable about said cylindrical axis;

said transfer portion of each of said plurality of picking arms being secured proximate an outer cylindrical surface of said cylindrical rotatable member;

said cylindrical rotatable member being rotatable about said cylindrical axis;

said transfer portion of each of said plurality of picking arms being secured proximate an outer cylindrical surface of said cylindrical rotatable member;

said transfer portion of each of said plurality of picking arms being substantially linear.

12. An apparatus for removing fruit as set forth in claim 1, wherein said rotatable member is a substantially cylindrical rotatable member having a cylindrical axis and defining a hollow internal cylindrical volume;

said cylindrical rotatable member being rotatable about said cylindrical axis;

said transfer portion of each of said plurality of picking arms being secured proximate an outer cylindrical surface of said cylindrical rotatable member;

said cylindrical rotatable member being rotatable about said cylindrical axis;

said transfer portion of each of said plurality of picking arms being secured proximate an outer cylindrical surface of said cylindrical rotatable member; and said transfer portion of each of said plurality of picking arms being substantially linear and extending radially outwardly relative to said cylindrical axis of said cylindrical rotatable member.

13. An apparatus for removing fruit as set forth in claim 1, wherein each extracting portion of said plurality of picking arms extends in a semi-circular hook shape through an angle of approximately 180 degrees.

14. An apparatus for removing fruit as set forth in claim 1, wherein said transfer portion of each of said plurality of picking arms is substantially linear;

each extracting portion of said plurality of picking arm extending in a semi-circular hook shape through an angle of approximately 180 degrees; and each retaining portion of said plurality of picking arms partially extending from said extracting portion toward said transfer portion and being generally perpendicular to said transfer portion.

* * * * *